US007271969B2

(12) United States Patent
Carpenter et al.

(10) Patent No.: US 7,271,969 B2
(45) Date of Patent: Sep. 18, 2007

(54) APPARATUS FOR PROVIDING HIGH SPEED, LINEAR-PHASE INTERPOLATION

(75) Inventors: Eric Carpenter, Rochester, MN (US); Michael Curtis, Rochester, MN (US); Raymond A. Richetta, Rochester, MN (US); Doug Spannring, Marshfield, WI (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 146 days.

(21) Appl. No.: 11/122,518

(22) Filed: May 5, 2005

(65) Prior Publication Data

US 2006/0250722 A1 Nov. 9, 2006

(51) Int. Cl.
*G11B 5/09* (2006.01)
*H04L 7/00* (2006.01)

(52) U.S. Cl. ............... 360/51; 360/48; 369/59.22; 375/371

(58) Field of Classification Search ............ None
See application file for complete search history.

(56) References Cited

U.S. PATENT DOCUMENTS

| 5,986,830 | A | 11/1999 | Hein |
| 6,359,486 | B1 | 3/2002 | Chen |
| 2003/0122588 | A1* | 7/2003 | Glenn ............ 327/65 |

* cited by examiner

*Primary Examiner*—William Korzuch
*Assistant Examiner*—Daniell L. Negrón
(74) *Attorney, Agent, or Firm*—David W. Lynch; Chambliss Bahner & Stophel (57) ABSTRACT

A method and apparatus for providing high speed, linear-phase interpolation. Signals from a plurality of differential pairs are weighted to produce an output clock having a selectable linear phase variation. A controller includes a pulse generator for providing a predetermined number of pulses having a predetermined phase shift and a predetermined frequency and an interpolator for processing the predetermined number of pulses having a predetermined phase shift and a predetermined frequency to generate a clock signal that is linearly adjustable between a predetermined number of output phases.

35 Claims, 9 Drawing Sheets

APPARATUS FOR PROVIDING HIGH SPEED, LINEAR-PHASE INTERPOLATION

BACKGROUND OF THE INVENTION

1. Field of the Invention

This invention relates in general to data processing, and more particularly to an apparatus for providing high speed, linear-phase interpolation.

2. Description of Related Art

It is desirable to integrate transceiver circuits on an integrated circuit (IC) chip to reduce size and power dissipation of the transceiver. To reliably process a received data signal, a receiver typically needs to match its operating characteristics with the characteristics of the received data signal. For example, in the case of baseband data transmissions, the receiver can derive a sample clock signal, and then use the sample clock signal to sample the received data signal at sample times that produce optimal data recovery. In this way, data recovery errors can be minimized. Precision timing control techniques are required to achieve and maintain such optimal sampling times, especially when the received data signals have high data rates, such as multi-gigabit-per-second data rates. Such timing control includes control of the phase and frequency of a sample clock signal used to sample the received data signal. As transmission data rates increase it is ever more important to generate the data recovery clock signal with accuracy, and to have close control over its adjustment in frequency and phase.

Developments in communications have recently provided increased speed and reliability in a wide range of pulse communications systems. For example, recently developed data storage devices, such as magnetic disk drive devices (i.e., hard disk drives), have increased storage capacity and increased data access speed. Such systems also utilize a high-speed phase interpolator. The present invention will be described in detail in the context of magnetic disk drive devices, but persons skilled in the pulse communications arts will readily apprehend that this invention provides an improved method for providing high speed, linear-phase interpolation in a wide variety of communication contexts.

The primary features of a magnetic disk drive device that affect storage capacity and access speed are the head, the recording medium, the servo mechanism, the signal processing technique used in the read/write channel, and the like. Among these, signal processing techniques utilizing PRML (Partial Response Maximum Likelihood) detection have greatly contributed to the increased storage capacities and high access speeds seen in modern magnetic disk drive devices.

A read channel circuit in a generic read/write channel circuit of a magnetic disk drive device includes components for initial processing of the analog read signal generated by the read/write head of the device. This processing provides automatic gain control (AGC) amplification, filtering, and equalization, as well as analog-to-digital conversion.

In a magnetic disk or tape data storage device, data is commonly stored on a magnetic medium by saturation recording in which each portion of the medium is magnetized to the point of saturation in one of two directions. The data to be stored is typically encoded to satisfy certain constraints and the encoded data is used to modulate the direction of magnetization. In a coded representation known as NRZI, each "one" bit of the encoded data causes a transition in the direction of magnetization, while each "zero" bit of the encoded data causes the magnetization direction to remain unchanged. A clock signal is used to write a sequence of encoded NRZI bits as a recording head moves along a track on the medium such that one bit is written at each clock tick.

In NRZ, there are no neutral or rest condition, such as a zero amplitude in amplitude modulation (AM), zero phase shift in phase-shift keying (PSK), or mid-frequency in frequency-shift keying (FSK). For a given data-signaling rate, i.e., bit rate, the NRZ code requires only one-half the bandwidth required by Manchester coding. With NRZ coding, 1's may be used to indicate magnet polarity change, while 0's may be used to indicate no change in polarity.

When a read head is passed over the recorded data track, a voltage pulse is produced at each transition in magnetization. Successive voltage pulses have opposite polarity since successive magnetic transitions are in opposite directions. The written NRZI data sequence may be reconstructed from the resulting voltage waveform by associating a "one" bit with every clock tick at which a pulse occurs and a "zero" bit with every clock tick at which no pulse occurs. The original user data may then be decoded from the NRZI data.

To recover the written or transmitted data sequence, the receiver requires a clock signal synchronized with the received waveform. At each tick of this synchronized clock signal the receiver or read circuitry generates one bit of the NRZI data sequence by processing the surrounding waveform. It is often impossible or at least undesirable to store or transmit a separate synchronized clock signal with the data waveform. Instead, constraints are applied to the encoded NRZI data sequence to ensure that timing information may be extracted from the data waveform itself and used to "recover" a synchronized clock signal. Such a system is referred to as "self clocking".

The interpolator is one block of the read/write clocking scheme in a HDD data channel. The output signal is a time shifted version of the input signal, wherein the time shift is determined from a programmable input which in a timing recovery application may be required to change on a sample to sample basis. However, as the received data signal rate increases into the multi-gigabit-per-second range, the difficulty in effectively controlling sampling processes, such as phase and frequency characteristics of the sample clock signal, correspondingly increases. Semiconductor circuits, such as complementary metal oxide semiconductor (CMOS) circuits, are often unable to operate at sufficiently high frequencies to optimally control the sampling processes. For example, it becomes increasingly difficult at such signal data rates to provide sufficiently short time delays usable for controlling sampling phases of the sample clock signal.

It can be seen then that there is a need for an apparatus for providing high speed, linear-phase interpolation.

SUMMARY OF THE INVENTION

To overcome the limitations in the prior art described above, and to overcome other limitations that will become apparent upon reading and understanding the present specification, the present invention discloses an apparatus for providing high speed, linear-phase interpolation.

The present invention solves the above-described problems by weighting signals from a plurality of differential pairs to produce an output clock having a selectable linear phase variation.

A controller for managing the reading and writing of data in accordance with the principles of the present invention includes a pulse generator for providing a predetermined number of pulses having a predetermined phase shift and a predetermined frequency and an interpolator for processing the predetermined number of pulses having a predetermined phase shift and a predetermined frequency to generate a clock signal that is linearly adjustable between a predetermined number of output phases.

In another embodiment of the present invention, a magnetic storage device is provided. The magnetic storage device includes a magnetic storage medium for recording data thereon, a motor for moving the magnetic storage medium, a head for reading and writing data on the magnetic storage medium, an actuator for positioning the head relative to the magnetic storage medium and a data channel for processing encoded signals on the magnetic storage medium, the data channel including a controller for managing the reading and writing of data, the controller further including a pulse generator for providing a predetermined number of pulses having a predetermined phase shift and a predetermined frequency and an interpolator for processing the predetermined number of pulses having a predetermined phase shift and a predetermined frequency to generate a clock signal that is linearly adjustable between a predetermined number of output phases.

In another embodiment of the present invention, an interpolator for processing a predetermined number of pulses having a predetermined phase shift and a predetermined frequency to generate a clock signal that is linearly adjustable between a predetermined number of output phases is provided. The interpolator includes a plurality of N differential pair blocks, coupled to a first differential output node and a second differential output node, for producing an interpolated ramp signal in response to a predetermined number of input pulses having a predetermined phase shift and a predetermined frequency, a Weight DAC, coupled to the plurality of N differential pair blocks, for sinking a predetermined current from a first and second adjacent differential pair block of the plurality of differential pair blocks, the sinking of a predetermined current from a first and second adjacent differential pair block of the plurality of differential pair blocks producing the interpolated ramp signal and a comparator, coupled to first and second differential output nodes, for producing an output clock at the bit-rate frequency in response to the interpolated ramp signal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the embodiments, reference is made to the accompanying drawings that form a part hereof, and in which is shown by way of illustration the specific embodiments in which the invention may be practiced. It is to be understood that other embodiments may be utilized because structural changes may be made without departing from the scope of the present invention.

The present invention provides an apparatus for providing high speed, linear-phase interpolation. The present invention provides an interpolator that weighs signals from a plurality of differential pairs to produce an output clock having a selectable linear phase variation.

Figure 1:
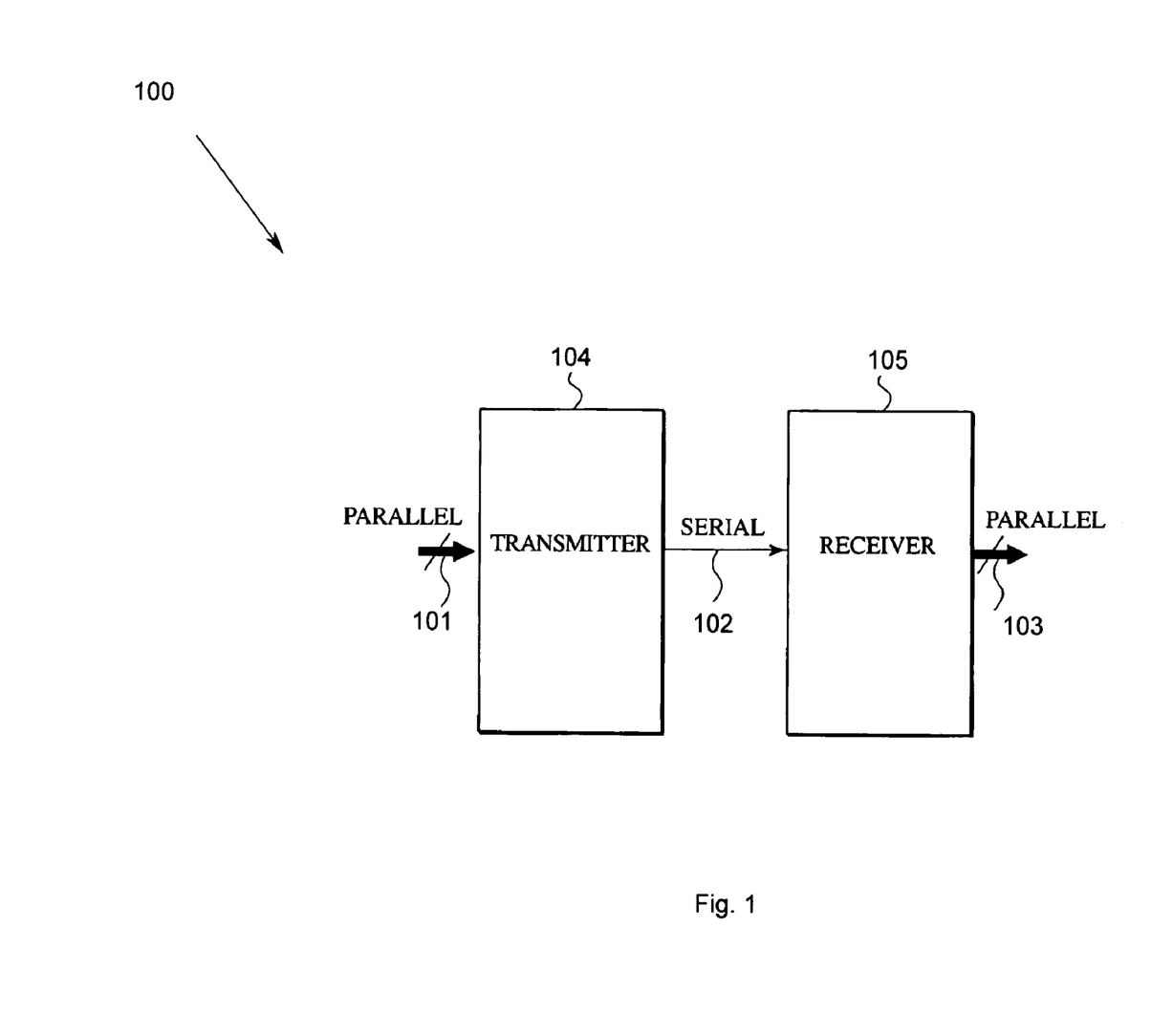
FIG. 1 is a block diagram showing a high-speed input/output (I/O) device.

FIG. 1 is a block diagram 100 showing a high-speed input/output (I/O) device. A transmitter 104 converts input parallel data 101 into serial data 102. For example, the serial data may be differential pair signals from CML (current mode logic). The converted serial data 102 is transmitted to a receiver 105. The receiver 105 receives the serial data 102 and converts it into parallel data 103. The serialization of parallel data into serial data and the deserialization of serial data into parallel data are carried out in synchronization with clock signals. The serial data 102 from the transmitter 104 is asynchronous with the clock signals of the receiver 105. To correctly read the serial data 102 in the receiver 105, the serial data 102 must be synchronized with the clock signals. To achieve this, a high speed, linear-phase interpolator is provided for processing the predetermined number of pulses having a predetermined phase shift and a predetermined frequency to generate a clock signal that is linearly adjustable between a predetermined number of output phases. The interpolator does not change the basic ring frequency, but rather adjusts the phase of the ring. Accordingly, the phase-locked loop is not disturbed.

As explained above, the present invention provides data pulse detection in a wide variety of pulse communication contexts. Nevertheless, a magnetic storage system will be used herein to describe the method for providing high speed, linear-phase interpolation in data communication devices. Persons skilled in the art of communications will readily apprehend that this invention is applicable in a wide variety of communication contexts.

Figure 2:
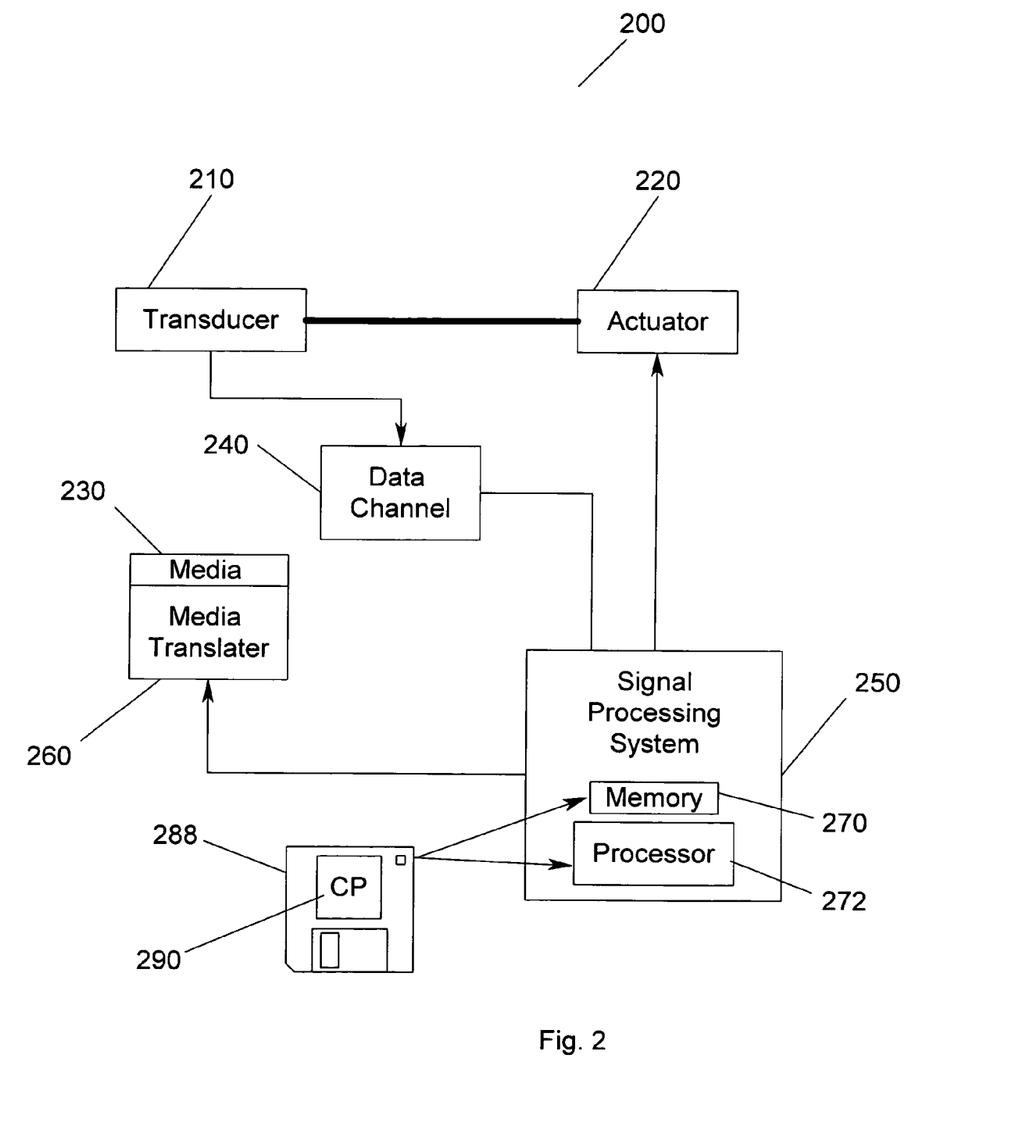
FIG. 2 illustrates a storage system according to an embodiment of the present invention.

FIG. 2 illustrates a storage system 200 according to an embodiment of the present invention. In FIG. 2, a transducer 210 is under control of an actuator 220. The actuator 220 controls the position of the transducer 210. The transducer 210 writes and reads data on magnetic media 230. The read/write signals are passed to a data channel 240. A signal processor system 250 controls the actuator 220 and processes the signals of the data channel 240. In addition, a media translator 260 is controlled by the signal processor system 250 to cause the magnetic media 230 to move relative to the transducer 210. Nevertheless, the present invention is not meant to be limited to a particular type of storage system 200 or to the type of media 230 used in the storage system 200.

Figure 3:
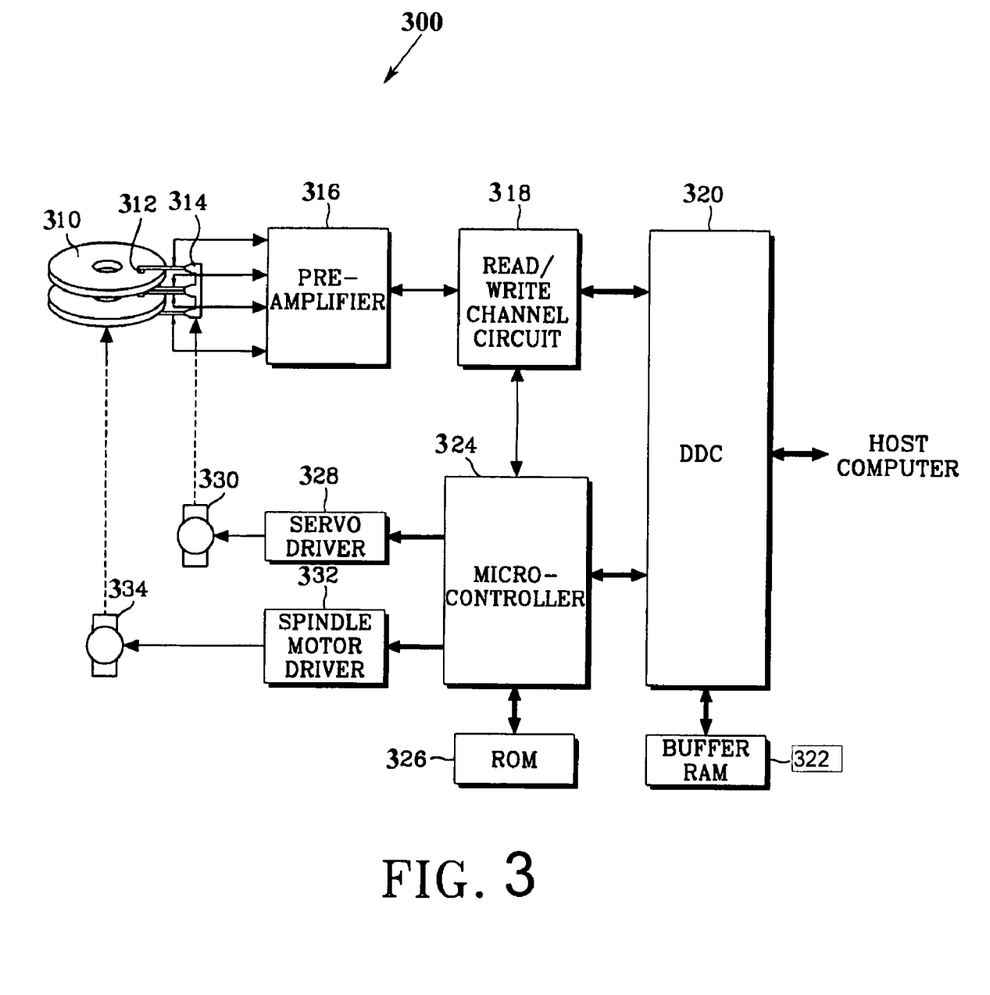
FIG. 3 is a block diagram of a magnetic disk drive device according to an embodiment of the present invention.

FIG. 3 is a block diagram of a magnetic disk drive device 300 according to an embodiment of the present invention. In FIG. 3, disks 310 are rotated by a spindle motor 334, and heads 312 are positioned at surfaces of corresponding ones of disks 310. Heads 312 are mounted on corresponding servo arms that extend from an E-shaped block assembly 314 to disks 310. Block assembly 314 has an associated rotary voice coil actuator 330 that moves block assembly 314 and thereby changes to positions of heads 312 for reading data from or writing data to a specified position on one or more of disks 310.

A pre-amplifier 316 pre-amplifies a signal picked up by heads 312 and thereby provides read/write channel circuit 318 with an amplified signal during a reading operation. During a write operation, pre-amplifier 316 transfers an encoded write data signal from the read/write channel circuit 318 to heads 312. In a read operation, read/write channel circuit 318 detects a data pulse from a read signal provided by pre-amplifier 316 and decodes the data pulse. Read/write channel circuit 318 transfers the decoded data pulse to a disk data controller (DDC) 320. Furthermore, read/write channel circuit 318 also decodes write data received from the DDC 320 and provides the decoded data to pre-amplifier 316.

DDC 320 both writes data received from a host computer (not shown) onto disks 310, through read/write channel circuit 318 and pre-amplifier 316, and transfers read data from disks 310 to the host computer. DDC 320 also interfaces between the host computer and a microcontroller 324. A buffer RAM (Random Access Memory) 322 temporarily stores data transferred between DDC 320 and the host computer, microcontroller 324, and read/write channel circuit 318. Microcontroller 324 controls track seeking and track following functions in response to read and write commands from the host computer.

A ROM (Read Only Memory) 326 stores a control program for microcontroller 324 as well as various setting values. A servo driver 328 generates a driving current for driving actuator 330 in response to a control signal, generated from microcontroller 324 that provides control of the position of heads 312. The driving current is applied to a voice coil of actuator 330. Actuator 330 positions heads 312 relative to disks 310 in accordance with the direction and amount of the driving current supplied from servo driver 328. A spindle motor driver 332 drives spindle motor 334, which rotates disks 310, in accordance with a control value generated from microcontroller 324 for controlling disks 310.

Figure 4:
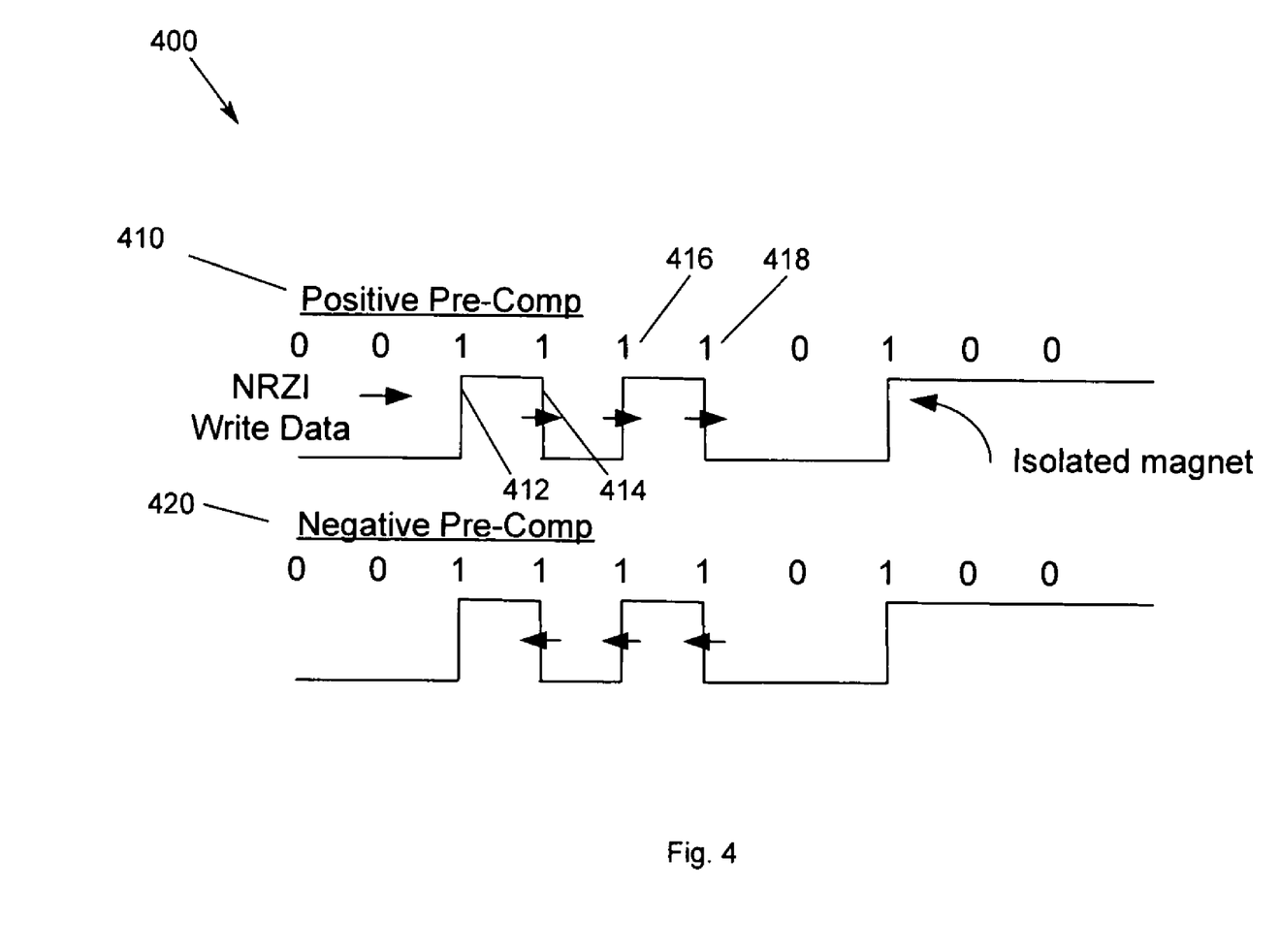
FIG. 4 illustrates phase interpolation within a write data channel according to an embodiment of the present invention.

FIG. 4 illustrates a phase interpolator within a write data channel 400 according to an embodiment of the present invention. One application of phase interpolation is during pre-compensation of write data in a data channel for a magnetic storage device. However, those skilled in the art will recognize that the present invention is not meant to be limited to pre-compensation and that the present invention may be applicable in many communications/electronic circuits and systems where making instantaneous phase jumps would be advantageous. Nevertheless, FIG. 4 demonstrates one example where phase interpolation is useful. Write pre-compensation is a method to shift the write data timing in a direction to aid in pre-equalizing the signal. As magnets are written on a disk media, close magnets can partially erase each other as unwanted signal timing shift. Write pre-compensation can aid in fixing this problem. Positive pre-compensation is defined as time shifting a pre-determined sequence of magnets in a positive direction relative to an isolated magnet. In FIG. 4, positive pre-compensation 410 and negative pre-compensation 420 are shown.

For example, for the positive pre-compensation 410, four magnetic "ones" 412-318 are written in a row and the last three "ones" 414-418 are time shifted to the right a certain amount. Negative pre-compensation 420 is similar but in the opposite direction. Current horizontal precoding technology has shown positive pre-compensation to be beneficial, where current perpendicular recording technology has shown negative pre-compensation to be beneficial. A one-length magnet pre-compensation total amount of up to 30% with a 1% to 2% accuracy may be required.

In hard drives and other asynchronous data channels, the clock of the readback channel must be synchronized to the written data. The timing information is extracted from the data waveform and then the clock frequency and phase are both adjusted accordingly to keep in step with the data.

Figure 5:
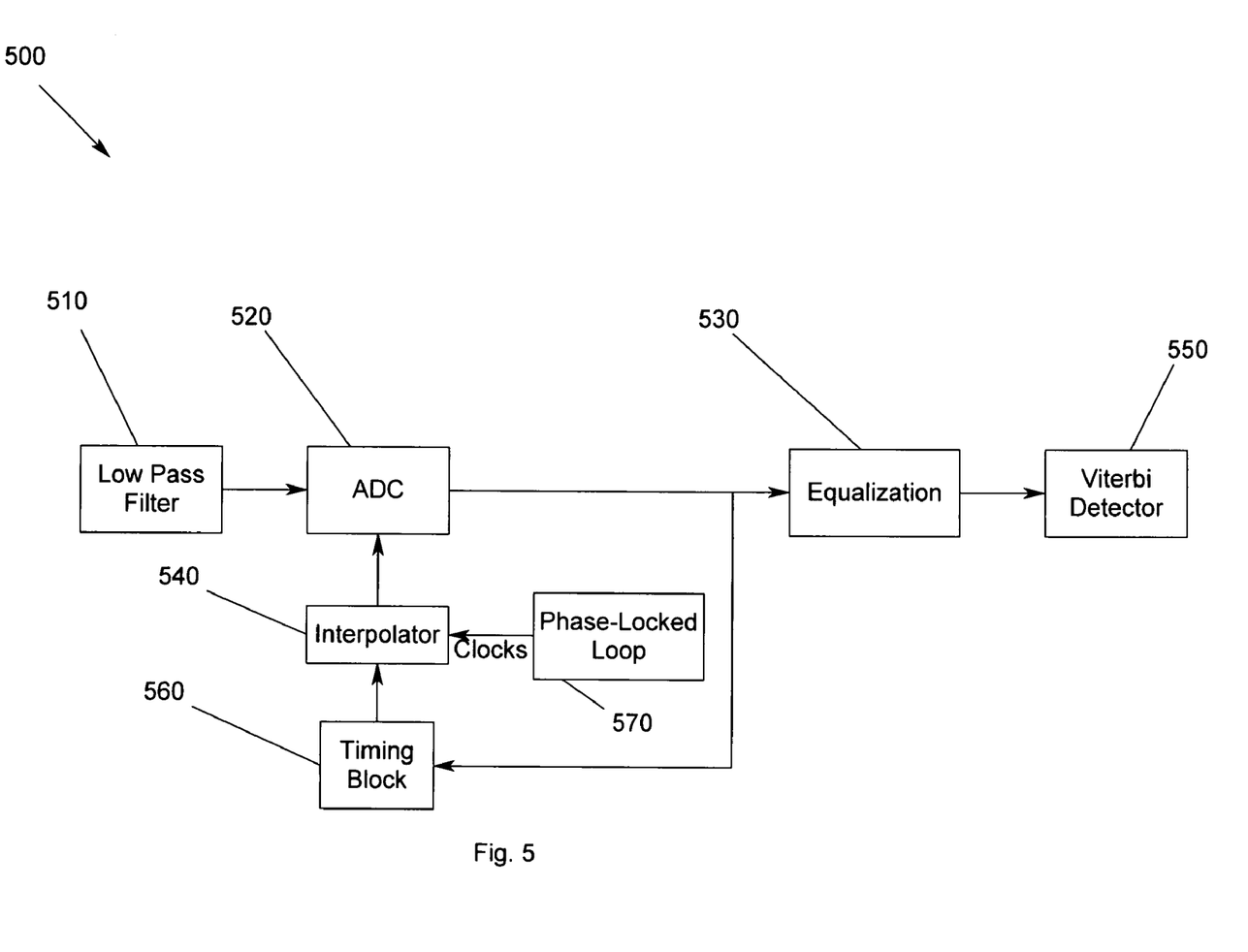
FIG. 5 is a block diagram illustrating the architecture of an asynchronous channel.

FIG. 5 is a block diagram 500 illustrating the architecture of an asynchronous data channel. In FIG. 5, the asynchronous data channel 500 includes an analog low-pass filter 510 that is provided for anti-aliasing purposes. The output of the analog low-pass filter 510 is provided to an analog-to-digital converter 520. The digital output of the analog-to-digital converter 520 is provided to an equalizer 530. The equalizer 530 is a digital filter that shapes the input signal to a transfer function expected by the Viterbi detector 550. The Viterbi detector 550 deconvolves the expected transfer function from the received signal to compute the data sequence. The digital signal from the analog-to-digital converter 520 is also provided to a timing block 560. Timing signals are derived and provided to an interpolator 540. A phase-locked loop 570 provides clocks to the interpreter 540. The interpolator 540 uses the samples at the input of the equalizer 530 to compute a clock signal that is provided to the analog-to-digital converter 520. Accordingly, the interpolator 540 replaces conventional analog PLL synchronization. The interpolator 540 interpolates between asynchronous samples to compute a synchronous sample at the appropriate position. However, the interpolator 540 does not change the basic ring frequency. Rather, the interpolator 540 merely adjusts the phase of the ring. Accordingly, the phase-locked loop 570 is not disturbed. While the interpolator 540 is shown separate from the phase-locked loop 570 in FIG. 5, an embodiment of the present invention may implement the interpolator 540 within the phase-locked loop 570.

Figure 6:
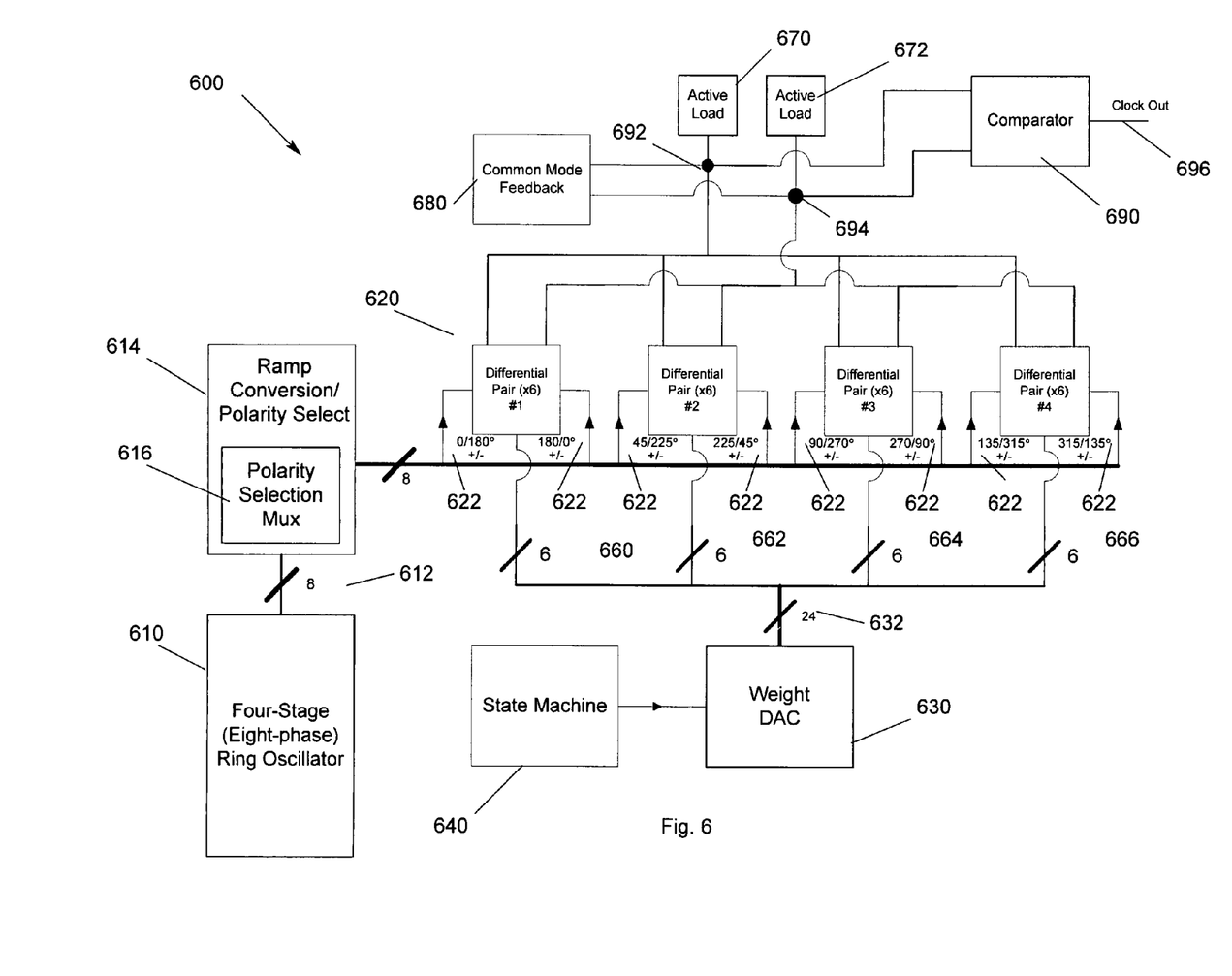
FIG. 6 is a block diagram of the an interpolator according to an embodiment of the present invention.

FIG. 6 is a block diagram of an interpolator 600 according to an embodiment of the present invention. In FIG. 6, a four-stage ring oscillator 610 provides eight 45°-phase-shifted pulses 612 at twice the bit-rate frequency to the interpolator 600. The interpolator 600 runs at this frequency and is later divided in half, syncing frequency and phase of the read data and the read/write clock by adjusting the clock to one of the ninety-six unique output phases. The interpolator 600 interpolates between those inputs to produce one of forty-eight unique output phases at the same frequency.

All eight phases 612 of the ring oscillator 610 are sent to the ramp conversion/polarity select block 614. Each phase and its complement are converted into a ramp waveform to aid in phase addition. The ramp conversion/polarity select block 614 includes a polarity selection multiplexer 616 that routes the appropriate phase (true or complement) to the corresponding differential pair block input 620. The polarity selection multiplexer 616 is used to switch the inputs of the differential pair blocks 620 to their complement values to achieve interpolation across the entire range of 0 to 360°. This process is shown as +/−622 on the inputs of the differential pair blocks 620. During the + selection, the first listed phase is at the input, while during the —selection, the second listed phase is connected to that input of the differential pair blocks 620. Thus, the polarity selection multiplexer 616 enables seamless clock phase changes by only changing when no weights are on the differential pair blocks. While FIG. 6 shows eight 45°-phase-shifted pulses 612 generated and eight weights are provided to differential pair blocks 620, those skilled in the art will recognize that the present invention may be scaled to provide a different number of shifted pulses and differential pair blocks, which in turn may provide finer (or coarser) phase interpolation.

Figure 7:
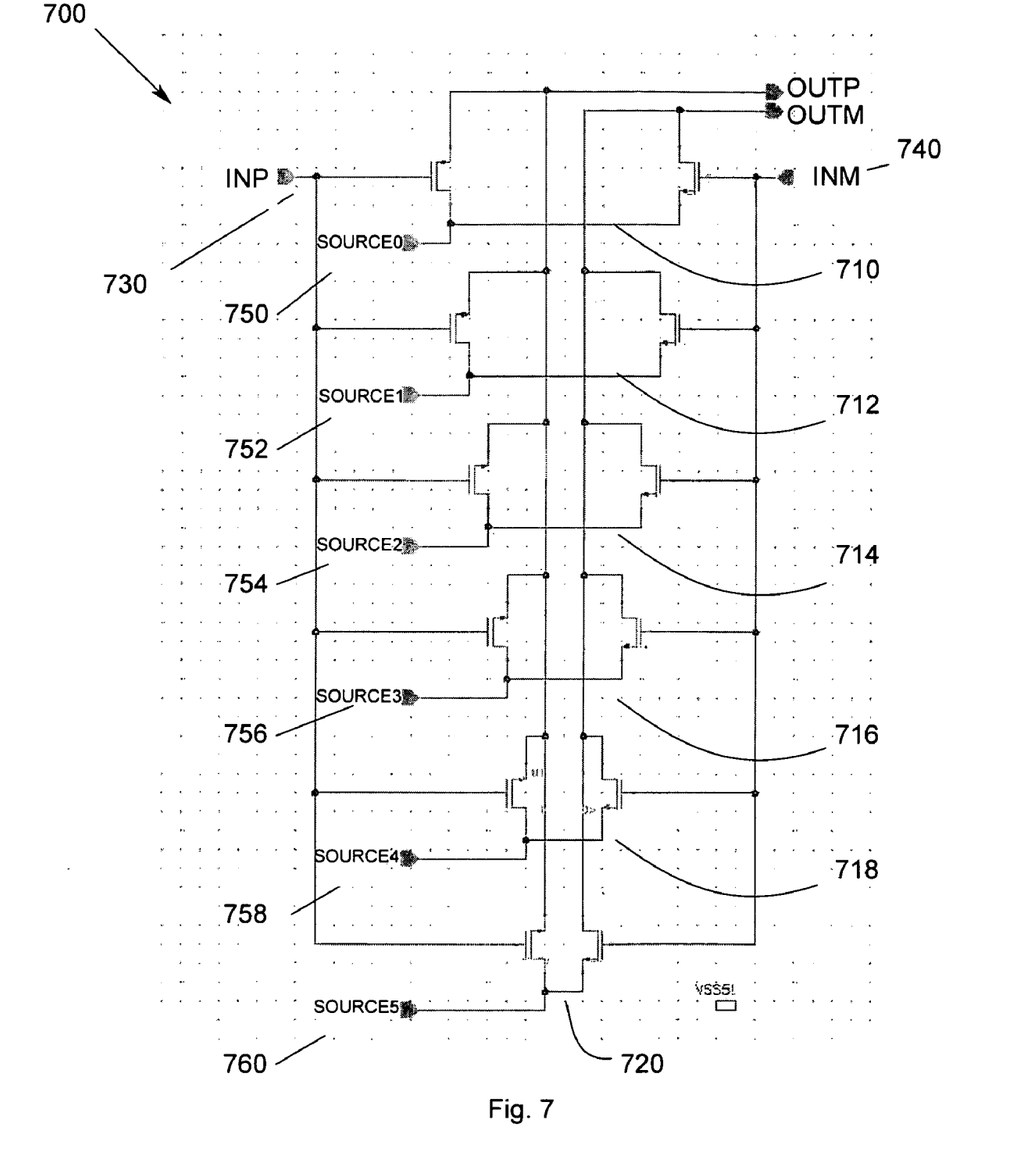
FIG. 7 illustrates the transistor configuration for each differential pair block according to an embodiment of the present invention.

FIG. 7 is a circuit diagram 700 showing the transistor configuration for each differential pair block according to an embodiment of the present invention. In FIG. 7, each differential pair block includes six source-coupled differential pairs 710-720. In each block, all the gates are common 730, and all the drains are common 740. Each source 750-760, however, is routed separately to the Weight DAC 630 shown in FIG. 6.

Referring again to FIG. 6, the Weight DAC 630 under control of a state machine 640 sinks a current of 6*I, where I is defined as a unit-current amount. This current, 6*I, is distributed between at most two adjacent differential pair blocks in unit-current amounts. The Weight DAC 630 can produce 24 current signals 632 which may be provided as 6 current signals 660-666 to each of the differential pairs 620. In the Weight DAC 630, every source of a particular differential pair block 620 is connected to one of six current sinks of equal weight (I) via a series switch (not shown). In each state, a total current of 6*I is always being sunk, with the state machine 640 deciding which of the series switches to turn on.

Referring to both FIGS. 6 and 7, when a differential pair block 620 has full weight on it (six units), each of its six source-coupled pairs 710-720 has the corresponding series switch turned on. At any given state, no more than two differential pair blocks 620 are active (having at least one of its six source-coupled pairs conducting current). To produce an interpolated phase, the state machine 640 varies the weight distribution on two adjacent differential pair blocks.

By adjusting the weight of one differential pair block 620 with respect to another, the weighted summation of the two input phases can produce one of five intermediate phases. The polarity selection multiplexer 616 can invert the inputs of the differential pair blocks 620 so that interpolation can be performed on the negative inputs as well, providing forty-eight unique output phases for selection. The outputs of the differential pair blocks 620 are coupled to an active load 670, 672. Common-mode feedback 680 is provided and a comparator 690 sits on the summing nodes 692, 694 and detects the zero crossings of the interpolated ramp signal to produce a CMOS-level output clock 696 to be divided to the bit-rate frequency.

Figure 8:
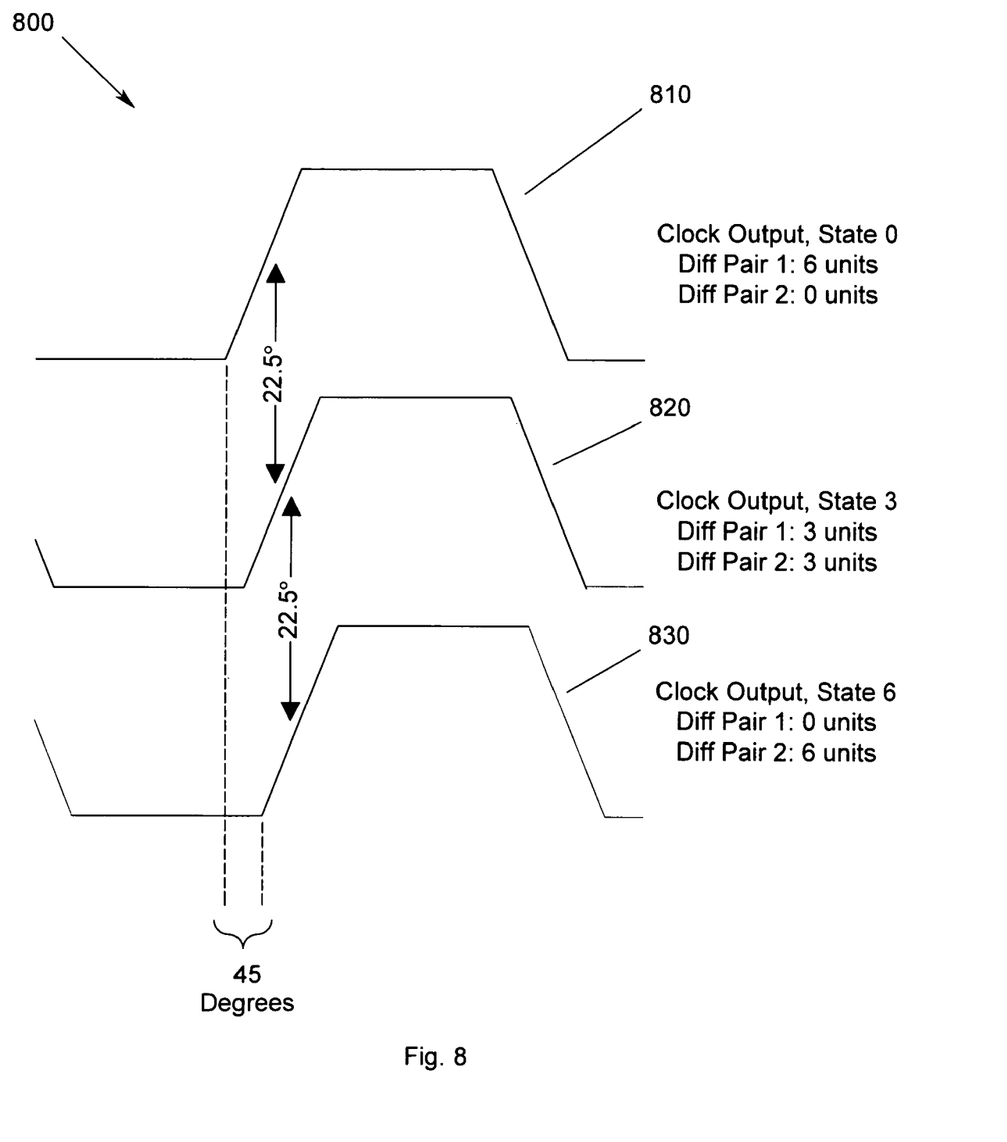
FIG. 8 illustrates examples of different weight distributions and the corresponding output clocks according to an embodiment of the present invention.

FIG. 8 is a clock output diagram 800 showing the different weight distributions and the corresponding output clocks according to an embodiment of the present invention. In FIG. 8, the first 810 and third 830 waveforms reflect a complete weight shift between two adjacent differential pair blocks, resulting in a 45° phase difference. The second waveform 820 exhibits an equal weight distribution between the two blocks, resulting in a 22.5° phase difference between the first 810 and third 830 clock outputs. The first clock output 810 is designated state 0 and is based on 6I from the first differential pair block. Similarly, the second clock output 820 is designated state 3 and is based on 3I from each of the first and second differential pair blocks, and the third clock output 830 is designated state 6 and is based on 6I from the second differential pair block.

For each unit-current weight distribution difference between any two blocks, the resulting clock output will vary by one-sixth of 45°. As described above with reference to FIG. 6, the polarity selection multiplexer 616 is used to switch the differential pair block inputs to their complement values to achieve interpolation across the entire range of 0 to 360°.

Figure 9:
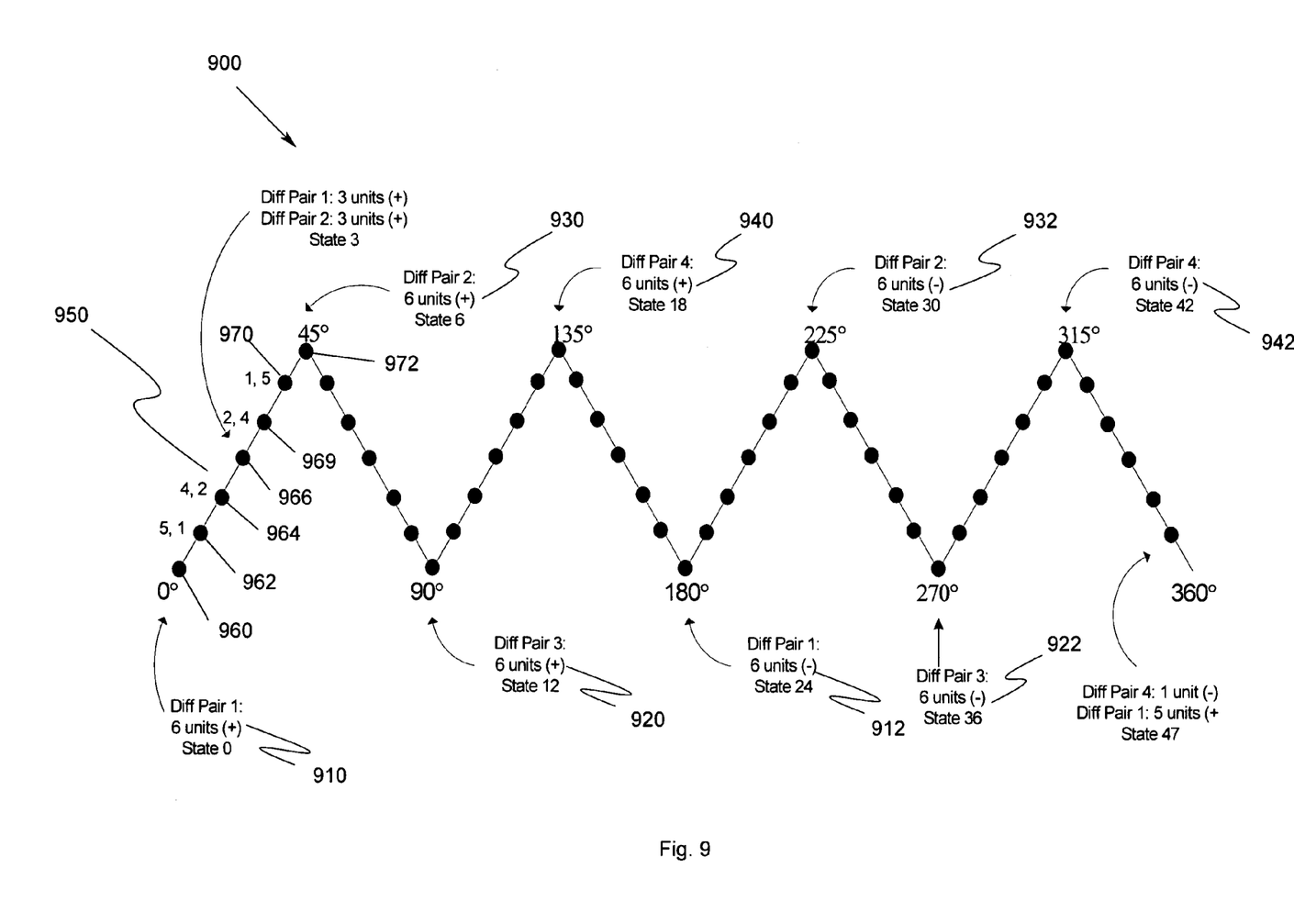
FIG. 9 illustrates the weight distribution and polarity select value for all forty-eight states according to an embodiment of the present invention.

FIG. 9 is a ramp diagram 900 showing the weight distribution and polarity select value for all forty-eight states according to an embodiment of the present invention. As shown in FIG. 9, every 180° a differential pair block receives its complement inputs 910, 912. This can also be seen at 920/922, 930/932 and 940/942. Looking at the first ramp 950, each phase marker 960-972 is shown to be formed from a combination of units from differential pair 1 and differential pair 2, e.g., marker 960 is formed using 6I from differential pair 1, marker 962 is formed using 5I from differential pair 1 and I from differential pair 2, marker 964 is formed using 4I from differential pair 1 and 2I from differential pair 2, . . . , marker 970 is formed using I from differential pair 1 and 5I from differential pair 2, and marker 972 is formed using 6I from differential pair 2. This continues by sequentially using differential pair 3 and differential pair 4, and then repeating with complement inputs 912, 922, 932, 942. Accordingly, the phase selection is anticipated and the appropriate phases are made ready for application to the appropriate differential pair block inputs. This switching is performed when the differential pair has no weight current to reduce disturbance on the output clock. Referring to both FIGS. 6 and 9, the comparator 690 sits on the summing nodes and detects the zero crossings of the interpolated ramp signal to produce a CMOS-level output clock to be divided to the bit-rate frequency.

In summary, embodiments of the present invention provide the ability to perform instantaneous phase jumps without missing clock pulses. This allows seamless clock phase changes to be performed. Accordingly, a high speed, linear-phase interpolator is provided for processing the predetermined number of pulses having a predetermined phase shift and a predetermined frequency to generate a clock signal that is linearly adjustable between a predetermined number of output phases.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A controller for managing the reading and writing of data, comprising:
   a pulse generator for providing a plurality of pulses having a predetermined phase shift and a predetermined frequency; and
   an interpolator comprising a plurality of differential blocks, each differential block comprising a plurality of differential pair transistors, the interpolator configured for receiving the plurality of pulses having a predetermined phase shift and a predetermined frequency, providing a ramp waveform having a phase corresponding to each of the plurality of pulses at an input of the differential blocks, producing an interpolated ramp signal by activating differential pairs in two differential blocks according to a weight distribution and detecting a zero crossings of the interpolated ramp signal to generate a clock signal that is linearly adjustable between a predetermined number of output phases.

2. The controller of claim 1, farther comprising a ramp conversion/polarity select block, disposed between the pulse generator and the interpolator, for receiving the predetermined number of pulses having a predetermined phase shift and a predetermined frequency and selecting an appropriate phase range for the clock signal.

3. The controller of claim 2, wherein the ramp conversion/polarity select block includes a polarity selection multiplexer, wherein the polarity selection multiplexer switches inputs of differential pair blocks to a complement value to achieve interpolation across the entire range of 0 to 360.

4. The controller of claim 1, wherein the interpolator further comprises:
  a plurality of differential pair blocks, coupled to a first differential output node and a second differential output node, for producing an interpolated ramp signal;
  a Weight DAC, coupled to the plurality of differential pair blocks, for sinking a predetermined current from a first and second adjacent differential pair block of the plurality of differential pair blocks, the sinking of a predetermined current from a first and second adjacent differential pair block of the plurality of differential pair blocks producing the interpolated ramp signal; and
  a comparator, coupled to first and second differential output nodes, for producing an output clock at the bit-rate frequency in response to the interpolated ramp signal.

5. The controller of claim 4, wherein the comparator produces the output clock at the bit-rate frequency by detecting a zero crossings of the interpolated ramp signal.

6. The controller of claim 4, wherein the predetermined current comprises 6I, wherein I is defined as a unit-current amount.

7. The controller of claim 4, wherein the predetermined current is distributed between at most two adjacent differential pair blocks in unit-current amounts.

8. The controller of claim 4, wherein the Weight DAC produces a plurality of current signals comprising a predetermined number of current signals for each of the plurality of differential pair blocks.

9. The controller of claim 8, wherein the plurality of current signals produce a plurality of clocks.

10. The controller of claim 4, wherein the Weight DAC is controlled by a state machine.

11. The controller of claim 10 wherein the state machine communicates to the Weight DAC which differential pair blocks to activate.

12. The controller of claim 4, wherein each of the plurality of differential pair blocks includes six source-coupled differential pairs having common gates, common drains and a source coupled to the Weight DAC.

13. The controller of claim 12, further comprising a state machine for controlling the Weight DAC, wherein the state machine communicates to the Weight DAC which differential pair blocks to activate and which of the six source-coupled pairs of an activated differential is to conduct current.

14. The controller of claim 4, wherein weighting a first differential pair block with respect to a second differential pair block by the Weight DAC provides a weighted summation of two input phases to produce one of five intermediate phases.

15. The controller of claim 4, wherein each of the plurality of differential pair blocks includes six source-coupled differential pairs, and wherein each of the six source-coupled pairs of an activated differential pair block conducting current provides one-sixth of 45° phase shift.

16. The controller of claim 4, wherein the predetermined number of pulses having a predetermined phase shift and a predetermined frequency further comprises eight 45°-phase-shifted pulses at twice the bit-rate frequency.

17. The controller of claim 1, wherein the interpolator provides seamless clock phase change.

18. A magnetic storage device, comprising:
  a magnetic storage medium for recording data thereon;
  a motor for moving the magnetic storage medium;
  a head for reading and writing data on the magnetic storage medium;
  an actuator for positioning the head relative to the magnetic storage medium; and
  a data channel for processing encoded signals on the magnetic storage medium, the data channel comprising a controller for managing the reading and writing of data, the controller further comprising:
    a pulse generator for providing a plurality of pulses having a predetermined phase shift and a predetermined frequency; and
    an interpolator comprising a plurality of differential blocks, each differential block comprising a plurality of differential pair transistors, the interpolator configured for receiving the plurality of pulses having a predetermined phase shift and a predetermined frequency, providing a ramp waveform having a phase corresponding to each of the plurality of pulses at an input of the differential blocks, producing an interpolated ramp signal by activating differential pairs in two differential blocks according to a weight distribution and detecting a zero crossings of the interpolated ramp signal to generate a clock signal that is linearly adjustable between a predetermined number of output phases.

19. The magnetic storage device of claim 18, farther comprising a ramp conversion/polarity select block, disposed between the pulse generator and the interpolator, for receiving the predetermined number of pulses having a predetermined phase shift and a predetermined frequency and selecting an appropriate phase range for the clock signal.

20. The magnetic storage device of claim 19, wherein the ramp conversion/polarity select block includes a polarity selection multiplexer, wherein the polarity selection multiplexer switches inputs of differential pair blocks to a complement value to achieve interpolation across the entire range of 0 to 360°.

21. The magnetic storage device of claim 18, wherein the interpolator further comprises:
  a plurality of differential pair blocks, coupled to a first differential output node and a second differential output node, for producing an interpolated ramp signal;
  a Weight DAC, coupled to the plurality of differential pair blocks, for sinking a predetermined current from a first and second adjacent differential pair block of the plurality of differential pair blocks, the sinking of a predetermined current from a first and second adjacent differential pair block of the plurality of differential pair blocks producing the interpolated ramp signal;
  a comparator, coupled to first and second differential output nodes, for producing an output clock at the bit-rate frequency in response to the interpolated ramp signal.

22. The magnetic storage device of claim 21, wherein the comparator produces the output clock at the bit-rate frequency by detecting a zero crossings of the interpolated ramp signal.

23. The magnetic storage device of claim 21, wherein the predetermined current comprises 6I, wherein I is defined as a unit-current amount.

24. The magnetic storage device of claim 21, wherein the predetermined current is distributed between at most two adjacent differential pair blocks in unit-current amounts.

25. The magnetic storage device of claim 21, wherein the Weight DAC produces a plurality of current signals comprising a predetermined number of current signals for each of the plurality of differential pair blocks.

26. The magnetic storage device of claim 25, wherein the plurality of current signals produce a plurality of clocks.

27. The magnetic storage device of claim 21, wherein the Weight DAC is controlled by a state machine.

28. The magnetic storage device of claim 27, wherein the state machine communicates to the Weight DAC which differential pair blocks to activate.

29. The magnetic storage device of claim 21, wherein each of the plurality of differential pair blocks includes six source-coupled differential pairs having common gates, common drains and a source coupled to the Weight DAC.

30. The magnetic storage device of claim 29, further comprising a state machine for controlling the Weight DAC, wherein the state machine communicates to the Weight DAC which differential pair blocks to activate and which of the six source-coupled pairs of an activated differential is to conduct current.

31. The magnetic storage device of claim 21, wherein weighting a first differential pair block with respect to a second differential pair block by the Weight DAC provides a weighted summation of two input phases to produce one of five intermediate phases.

32. The magnetic storage device of claim 21, wherein each of the plurality of differential pair blocks includes six source-coupled differential pairs, and wherein each of the six source-coupled pairs of an activated differential pair block conducting current provides one-sixth of 45° phase shift.

33. The magnetic storage device of claim 21, wherein the predetermined number of pulses having a predetermined phase shift and a predetermined frequency further comprises eight 45°-phase-shifted pulses at twice the bit-rate frequency.

34. The magnetic storage device of claim 18, wherein the interpolator provides seamless clock phase change.

35. An interpolator for processing a predetermined number of pulses having a predetermined phase shift and a predetermined frequency to generate a clock signal that is linearly adjustable between a predetermined number of output phases, the interpolator comprising:
 a plurality of differential pair blocks, coupled to a first differential output node and a second differential output node, for producing an interpolated ramp signal in response to a predetermined number of input pulses having a predetermined phase shift and a predetermined frequency;
 a Weight DAC, coupled to the plurality of differential pair blocks, for sinking a predetermined current from a first and second adjacent differential pair block of the plurality of differential pair blocks, the sinking of a predetermined current from a first and second adjacent differential pair block of the plurality of differential pair blocks producing the interpolated ramp signal; and
 a comparator, coupled to first and second differential output nodes, for producing an output clock at the bit-rate frequency in response to the interpolated ramp signal.

* * * * *